Aug. 5, 1941.  C. A. CADWELL  2,251,820
RAIL BOND
Filed Aug. 21, 1939
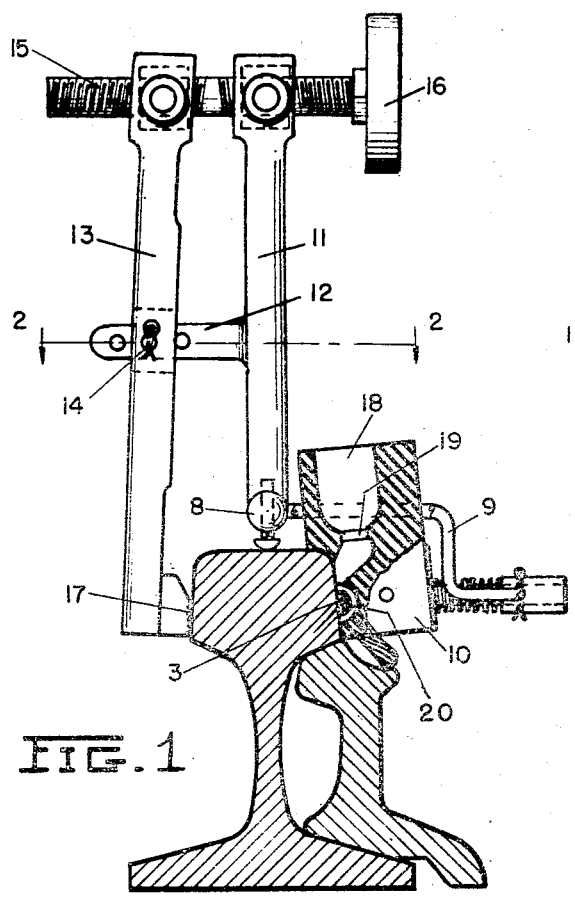
FIG. 1.
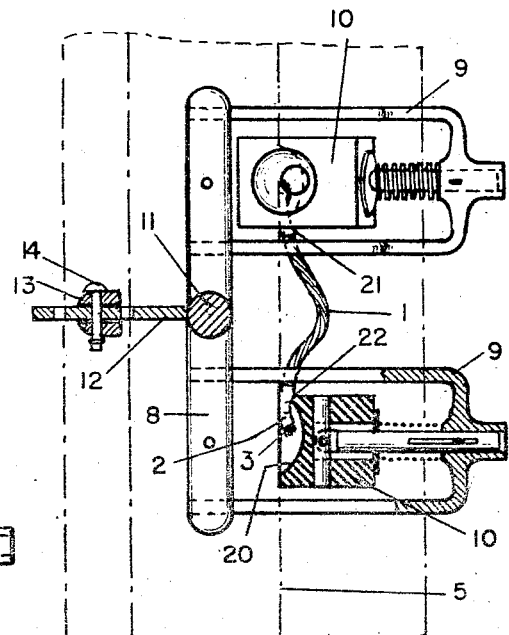
FIG. 2.
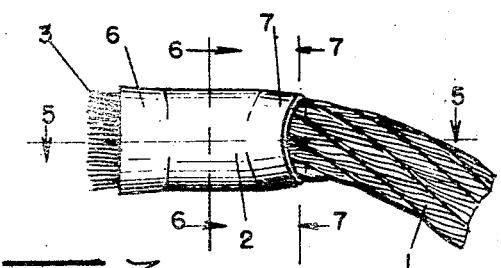
FIG. 3.
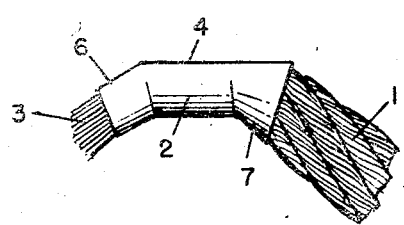
FIG. 4.
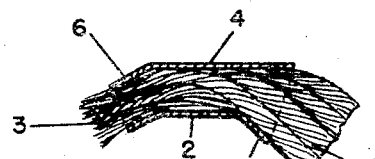
FIG. 5.
FIG. 6.
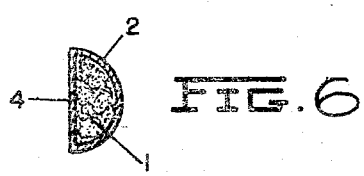
FIG. 7.
INVENTOR.
CHARLES A. CADWELL.
BY Oberlin, Limbach & Day
ATTORNEYS.

Patented Aug. 5, 1941

2,251,820

UNITED STATES PATENT OFFICE 2,251,820

RAIL BOND

Charles A. Cadwell, Cleveland, Ohio, assignor to The Electric Railway Improvement Company, Cleveland, Ohio, a corporation of Ohio Application August 21, 1939, Serial No. 291,174

3 Claims. (Cl. 173—278)

This invention relates, as indicated, to rail bonds, and to a method of attaching such bonds to the rails.

One of the major difficulties encountered in attaching the usual signal bonds and the like to steel rails where molten metal is employed as the attaching medium has been the failure to obtain complete interfusion of the bond end and the weld metal. This has been particularly apparent in the cast welding of copper bonds such as signal bonds to steel rails, the bonds comprising stranded conductor bodies sheathed near the ends by metal sleeves, usually of copper. In the cast weld process, in which the molten metal such as copper may be produced by an exothermic reaction, but a small amount of metal is employed to make the weld and it is important that such metal make a firm juncture between the rail and the bond. To do so the molten metal must interfuse with the individual strands of the bond. Copper, however, is an excellent conductor of heat and in the past the molten weld metal has generally chilled so quickly, the amount employed being small, that a most imperfect connection has been obtained with the stranded conductor body.

It is, therefore, a primary object of this invention to provide a rail bond so formed that when cast welded to a steel rail the end of such bond will be thoroughly interfused with the weld metal.

Another object of this invention is to provide a copper rail bond for attachment by cast welding to a steel rail, the ends of said bond being so shaped as to ensure proper interfusion with the weld metal.

A further object is to provide a method of cast welding rail bonds to rails whereby a sound juncture is ensured between the weld metal and the end of the bond.

Other objects will appear as the description proceeds.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:

Fig. 1 is a side elevational view of a mold clamped to a rail-head, the rail and a portion of the mold being shown in cross section with a bond end shown positioned in the mold cavity;

Fig. 2 is a top view of the molds and their supporting frames, the clamping means being taken in cross-section along the line 2—2 on Fig. 1 and one mold being shown in horizontal cross-section;

Fig. 3 shows the end portion of a stranded conductor formed in accordance with the present invention;

Fig. 4 is a view of the same end portion as in Fig. 3 but taken at right angles thereto;

Fig. 5 is a longitudinal cross-sectional view taken along the line 5—5 on Fig. 3;

Fig. 6 is a cross-sectional view taken along the line 6—6 on Fig. 3; and

Fig. 7 is a cross-sectional view taken along the line 7—7 on Fig. 3.

Referring now more particularly to the drawing and especially Figs. 3 and 4, the rail bond of this invention may comprise a stranded conductor body 1 of a metal such as copper circumferentially bound together adjacent the ends thereof by means of a metal sleeve 2 with the end 3 of said conductor body slightly protruding therefrom. Said sleeve has a rail contacting face 4 which is held against the side of the rail-head 5 as shown in Fig. 4, and a portion 6 angularly disposed thereto whereby said protruding end 3 of said conductor body 1 is positioned out of contact with and away from said rail-head. The inner end 7 of said sleeve is flared and serves to protect the strands of the attached bond from flexing and breaking at this point. It will thus be seen that in this embodiment of the invention the metal sleeve serves several purposes including prevention of the loosening of the strands of the cable, positioning of the end and extremity of the cable strands relative to the side of the rail-head during the welding operation, and protection of the strands of the cable where they enter the terminal of the finished bond. Of course, when bonds of solid roding are employed the ends may simply be bent to the proper positions.

The bond of this invention is preferably employed in conjunction with a rail bonding apparatus of the type illustrated in Figs. 1 and 2 of the drawing and more particularly described in my co-pending application Serial No. 243,351 filed December 1, 1938.

Briefly, such apparatus comprises a frame piece 8 to which two molds, identical except as to the location of the opening for the bond, are attached. A description of one of such molds together with its supporting members follows:

An angular frame 9 attached to said frame piece 8 supports a tiltably and resiliently mounted mold block 10. Midway on said frame piece 8 and midway between the two mold blocks, as shown in Fig. 2, is a fixedly attached upright fulcrum arm 11 having a lateral arm 12 located substantially midway of its length, and on which a second fulcrum arm 13 is pivoted by means of a pin 14. Extending between the upper ends of said fulcrum arms is a screw member 15 having oppositely pitched threads at its opposite ends. By means of the handwheel 16 the upper ends of the fulcrum arms may be moved toward or away from each other thus correspondingly unclamping and clamping the mold blocks against the face of the rail head. The fulcrum arm 13 is provided with a clamping foot 17 adapted to engage a face of the rail-head.

The upper half of said mold block 10 is hollowed out to form a crucible 18 with a sprue opening 19 in the bottom thereof communicating with the mold cavity 20 in which the sheathed portion 2 and extremity of the stranded conductor body 1 is positioned and held. The two molds differ, as above pointed out, only in the location of the side openings 21 and 22 in which the ends of the conductor are inserted, such openings being located, of course, on the sides of the mold blocks respectively facing each other.

When a bond formed in accordance with this invention is positioned on the rail as shown in Fig. 2 the extremity 3 of such bond will be substantially centrally positioned in the mold cavity. Then when the charge of molten copper produced in the crucible 18 as by means of an exothermic reaction (see my co-pending application Serial No. 243,394 filed December 1, 1938) drops into the mold cavity said extremity 3 of the conductor is at once enveloped and completely surrounded by the molten mass causing proper interfusion of each strand of the conductor and the weld metal. By permitting the conductor to protrude from the sleeve each strand thereof merges into the welded terminal and the finished bond is a composite bond of which each strand is a unit.

As may be readily understood from the foregoing description a much superior bond is obtained both as to strength and electrical contact when affixed to the rail in accordance with the above method. The bond itself is inexpensive of manufacture and requires the employment of no great skill in its attachment.

Other forms may be employed embodying the features of my invention instead of the one here explained, change being made in the form or construction, provided the elements stated by any of the following claims or the equivalent of such stated elements be employed.

I, therefore, particularly point out and distinctly claim as my invention:

1. As an article of manufacture, a rail bond to be welded to the surface of a rail, comprising a stranded conductor body and means binding the strands circumferentially together adjacent an end thereof with a portion of said stranded body protruding therefrom, a substantially flat rail-contacting face on said binding means and a portion thereof angularly disposed to said face whereby the protruding end of said stranded body may be positioned out of contact with the rail, and whereby welding metal will interfuse with the ends of the individual strands of said conductor body.

2. As an article of manufacture, a rail bond to be welded to the surface of a rail, comprising a stranded copper conductor body and means binding the strands circumferentially together adjacent an end thereof with a portion of said stranded body protruding therefrom, said means comprising a copper sleeve having a rail-contacting portion and a portion angularly disposed thereto whereby the protruding end of said stranded body may be positioned out of contact with the rail surface when said bond is applied to such rail, and whereby welding metal will interfuse with the ends of the individual strands of said conductor body.

3. As an article of manufacture, a rail bond to be welded to the surface of a rail, comprising a stranded conductor body and means binding the strands circumferentially together adjacent an end thereof with a portion of said stranded body protruding therefrom, said means comprising a metal sleeve having a flat rail-contacting face, the outer portion of said sleeve being bent at an angle to such face to position the protruding end of said stranded body at an angle out from said rail when said sleeve is held in contact therewith, whereby welding metal will interfuse with the ends of the individual strands of said conductor body.

CHARLES A. CADWELL.